Figure 1:
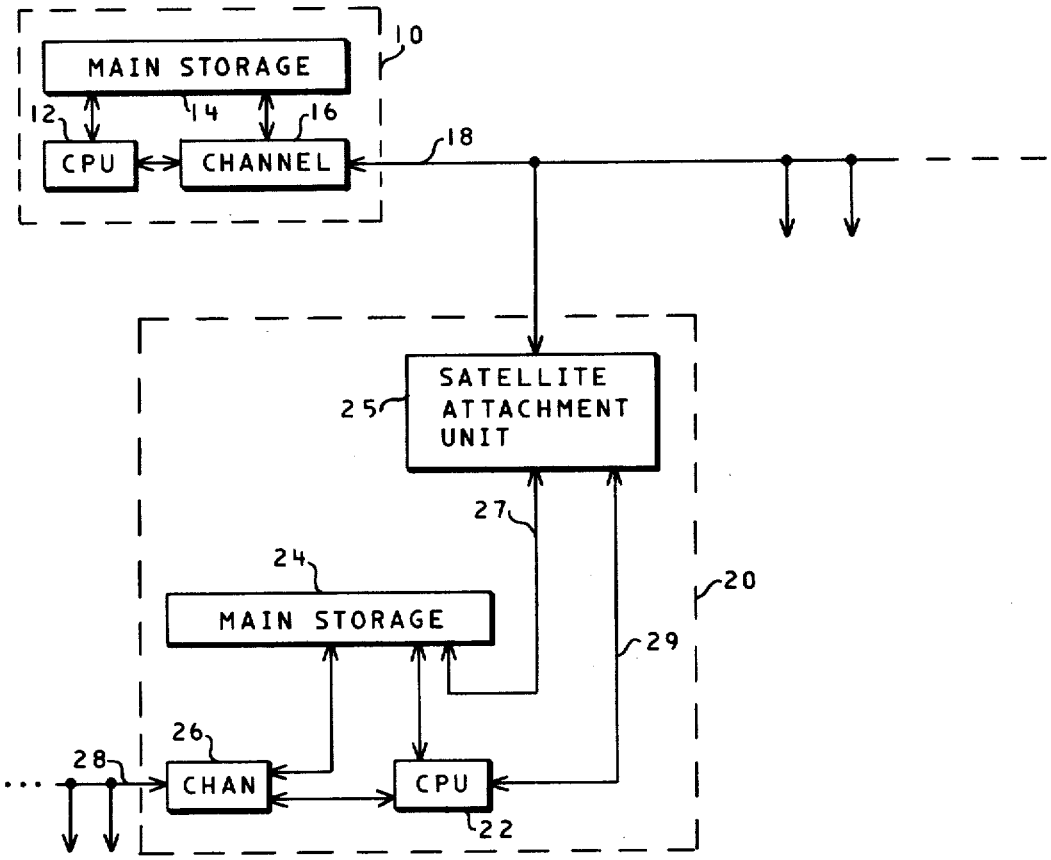
Figure 2:
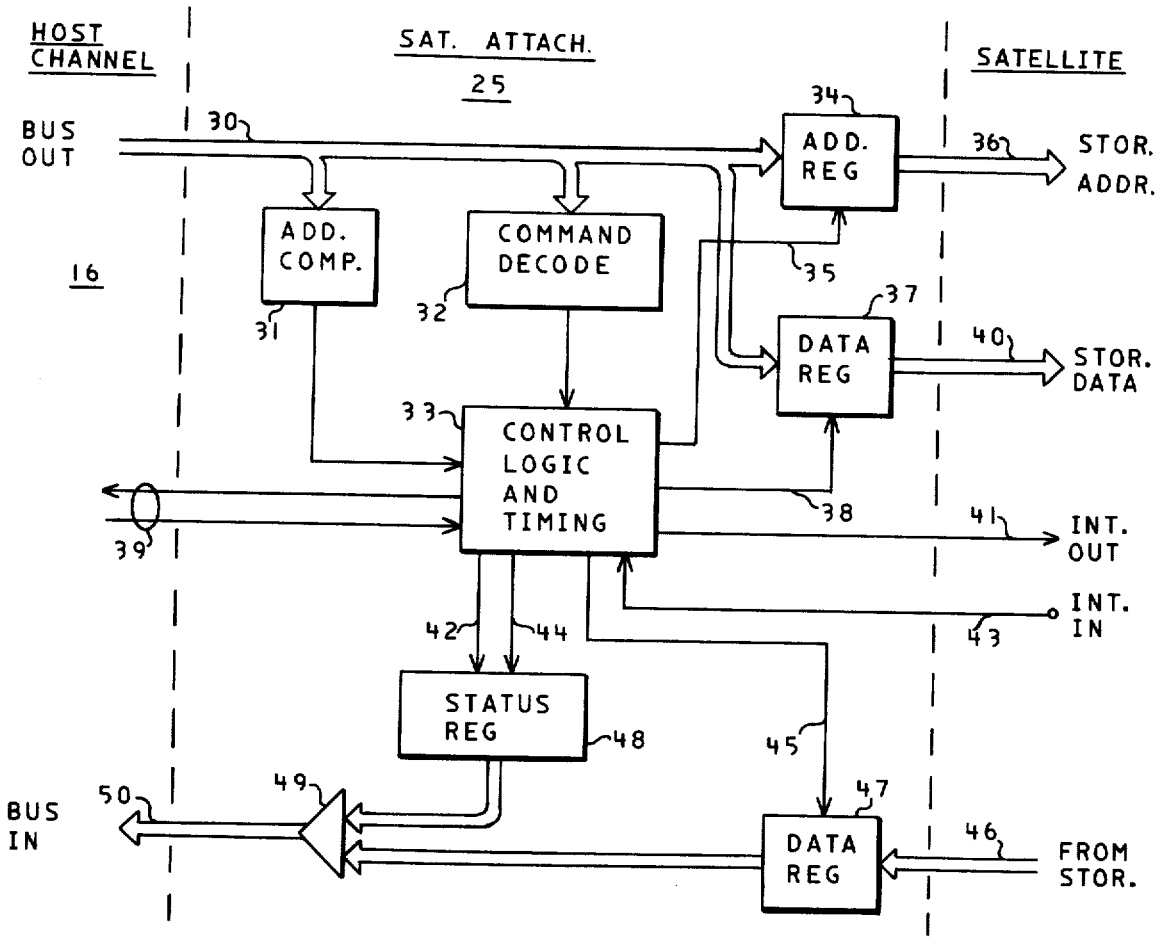
Figure 3:
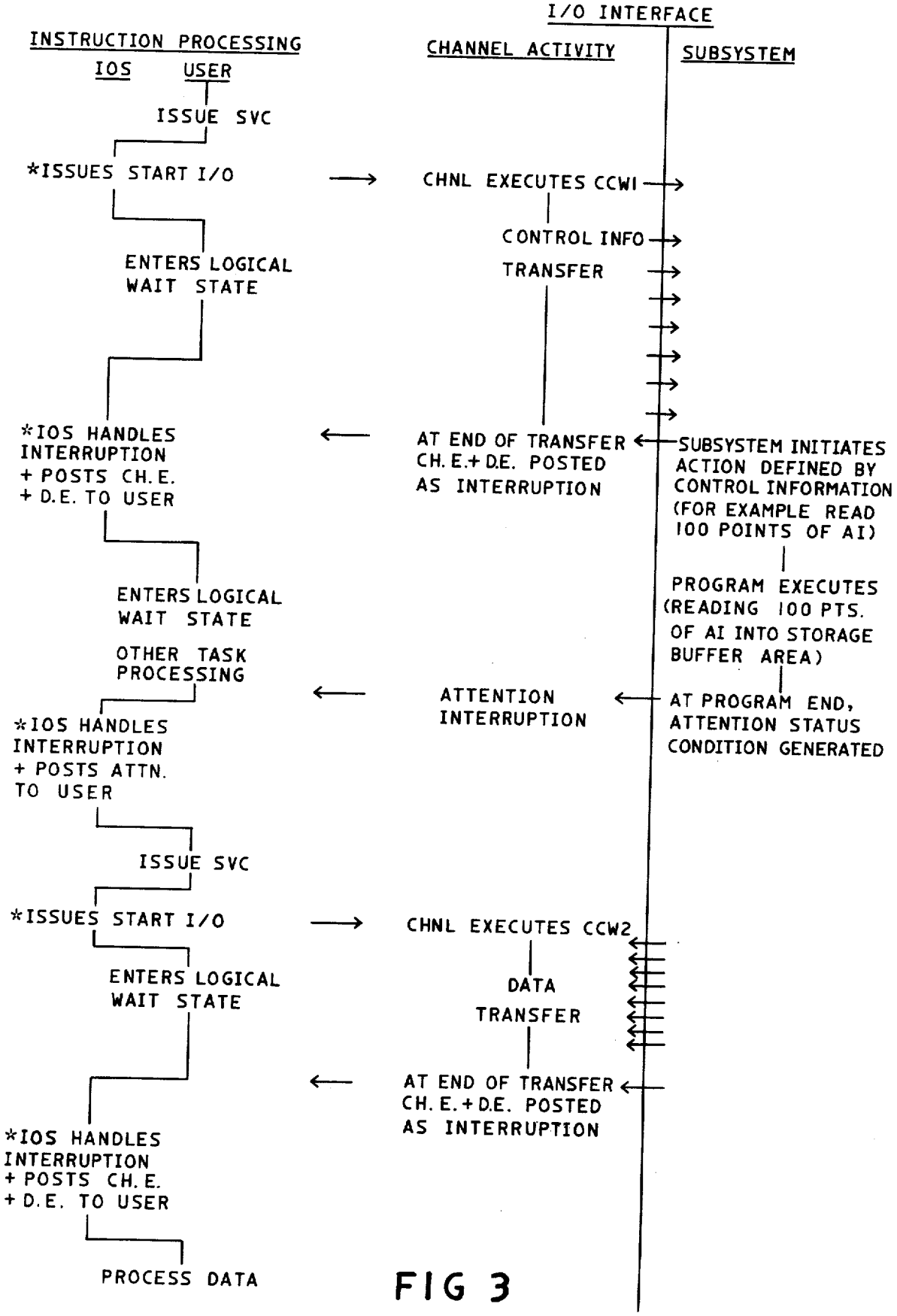
Figure 4:
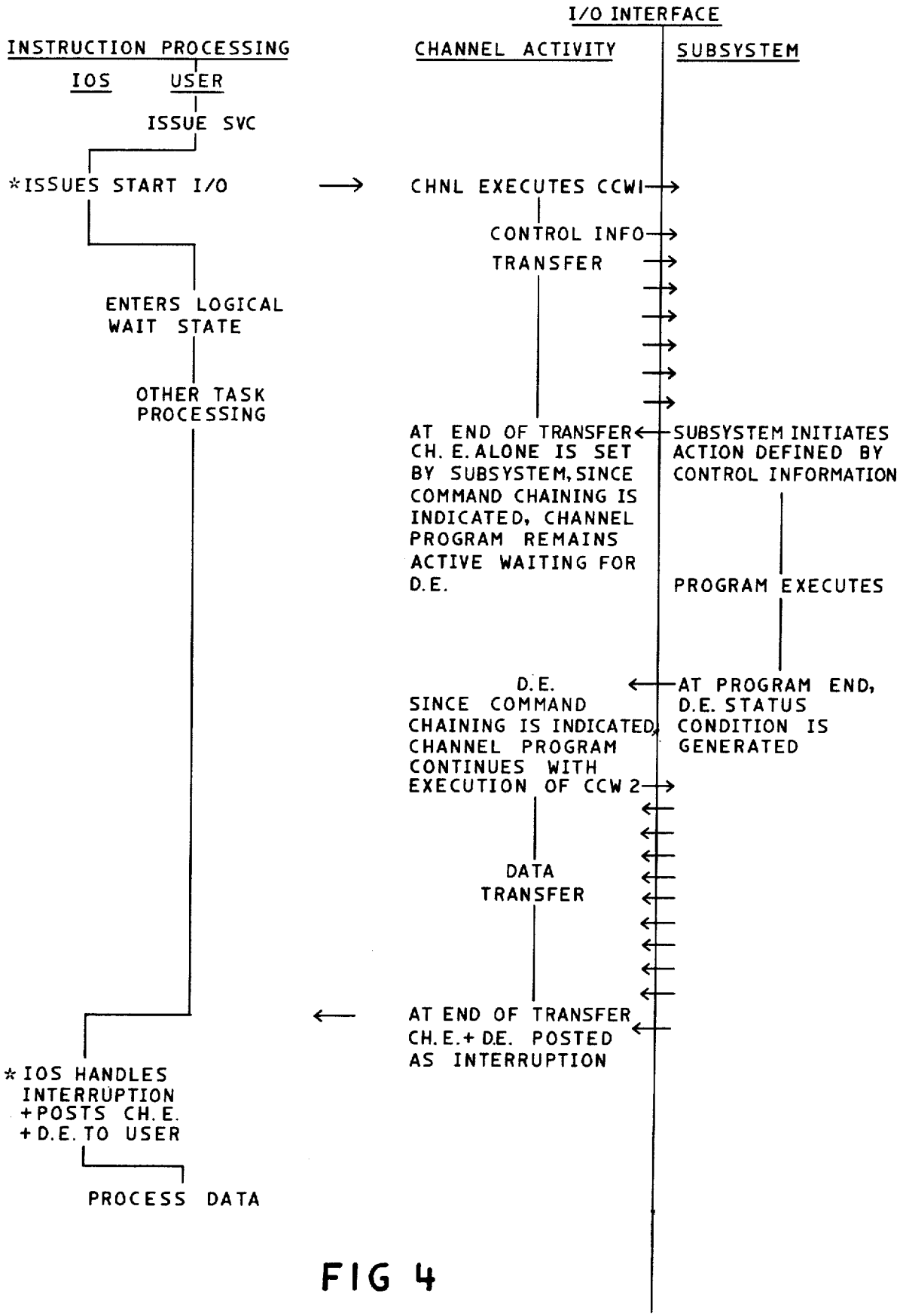

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the noveity of the disclosed subject matter.

PUBLISHED JULY 6, 1976

948 O.G. 8

T948,012

MULTIPROCESSOR INTERFACING APPARATUS

Max A. Bouknecht and Michael I. Davis, Boca Raton, Fla., and Matthew J. Mitchell, Jr., Endicott, N.Y., assignors to International Business Machines Corporation, Armonk, N.Y.

Continuation of application Ser. No. 374,448, June 28, 1973, This application July 29, 1975, Ser. No. 600,181

**Int. Cl. G06f *3/00***

U.S. Cl. 340—172.5

4 Sheets Drawing. 20 Pages of Specification

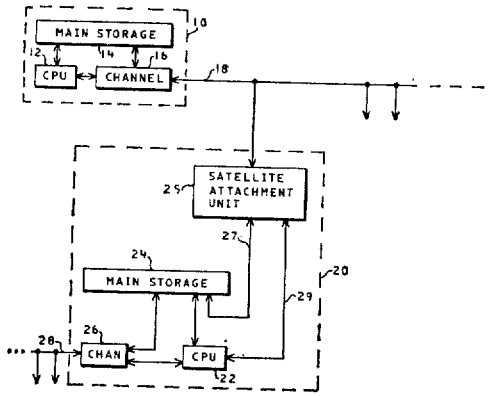

A host data processing system communicates through a channel to a subsystem capable of performing autonomous tasks. The host processor provides a special control command in association with a data set defining the tasks to be performed with both this command and the data set being transferred through the channel to the subsystem. An interfacting adapter recognizes the presence of the special command to provide a response to the channel relieving it of further connection to the subsystem after the task defining data set transfer is completed. Execution of the task defined by the data set in the subsystem causes he adapter to return a signal to the channel indicative that the task has been performed. The channel can then notify the host processing system or, if command chaining is indicated, can immediately proceed to transfer data reflecting the results of the task performance to the host processing system.